Patented Jan. 5, 1932

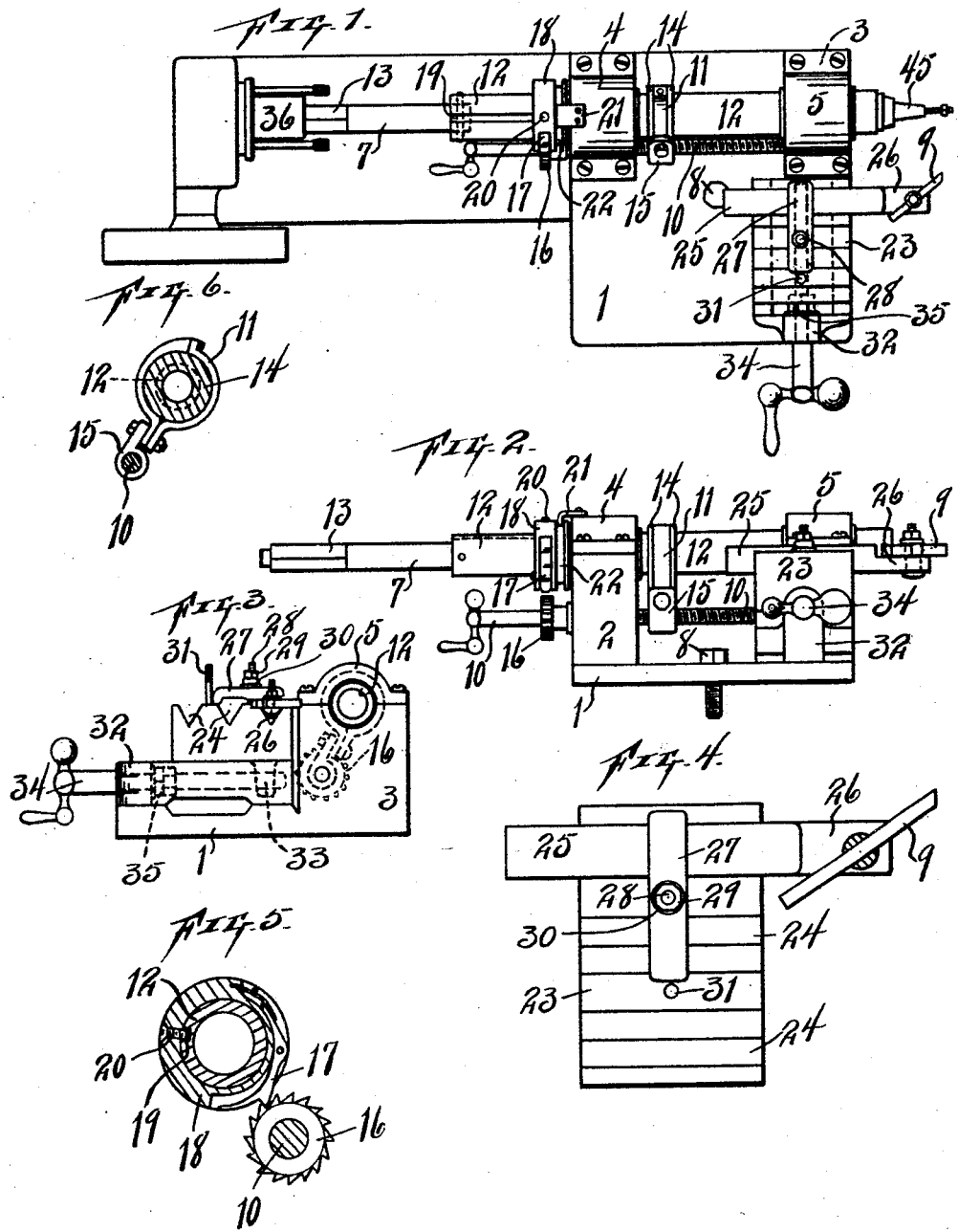

1,840,092

UNITED STATES PATENT OFFICE

SAMUEL A. B. HAMILTON AND CHRISTIAN A. LAUSEN, OF FORT WORTH, TEXAS, ASSIGNORS, BY MESNE ASSIGNMENTS, OF ONE-THIRD TO F. J. KELLER, ONE-THIRD TO S. T. BIBB, AND ONE-THIRD TO W. B. POWELL

BRAKE DRUM TRUING MACHINE

Application filed November 23, 1929. Serial No. 409,327.

Our invention relates to a machine for truing brake drums and the like; and the object is to provide a simple machine that will be highly efficient in truing brake drums and the like and which is simple in construction and operation. One advantage of this machine is that it is easily anchored for work and the work cannot move out of alignment when once placed on the machine and another advantage is that the machine has connections by which the machine can be driven by various types of lathes, and the machine is automatically adjustable to the work to be done. Other objects and advantages will be fully explained in the following description and the invention will be more particularly pointed out in the claims.

Reference is had to the accompanying drawings which form a part of this application.

Fig. 1 is a plan view of the machine.

Fig. 2 is a side elevation of the same.

Fig. 3 is an end elevation of the machine.

Fig. 4 is a plan view of the cutting tool holder.

Fig. 5 is a transverse section of the work adjusting means.

Fig. 6 is a detail view of means for controlling movement of the work carrying shaft.

Similar characters of reference are used to indicate the same parts throughout the several views.

The machine is provided with a base 1 having upright extensions 2 and 3. Bearings 4 and 5 are bolted to the extensions 2 and 3 respectively. The base 1 is to be bolted to the table or platform of a lathe or other structure, by a bolt 8. The driving shaft is in two parts 7 and 12. The part 7 has a portion 13 to be engaged by the lathe chuck. The part 12 is journaled in the bearings 4 and 5. The shaft members 7 and 12 are revolved by the lathe or other driving means and these members are moved axially by a screw shaft 10 and co-operating parts for moving the work to be done past the blade 9. A yoke 11 is made rigid with the shaft member 12. The lower part of the yoke is in two parts and clamped on a collar 14 which is integral with the shaft member 12. A nut 15 is bolted rigidly to the yoke 11. A feed control shaft 10 is journaled in the bearing members 2 and 3. This shaft 10 moves the yoke 11. The shaft 10 is driven from the shaft member 12 by means of a ratchet wheel 16 which is rigid with screw shaft 10, and by a spring dog 17 which is attached to a collar 18 which is loosely mounted on the shaft member 12. When the shaft 7 is driven, the shaft member 12 will also be driven, being bolted to the shaft 7. The dog 17 will actuate the ratchet wheel 16 and so revolve the shaft 10 which is threaded through the nut 15. The shaft member 12 is movable through the collar 18 which is loosely mounted on the shaft 12 and is also nonrevolubly mounted on this shaft. The shaft 12 has a longitudinal groove 19 and a lug 20 is screwed through the collar and projected into the groove 19. When the screw shaft 10 is revolved by the dog 17, the shaft member 12 will be axially moved to advance the work which is being carried by the spindle 45. The spindle 45 moves the work past the blade 9 for trimming the work. The shaft 7 has a portion thereof square in cross-section so that the shaft will be driven by the driving connection. The travel of the shaft member 12 may be varied by different sized ratchet wheels 16, or ratchet wheels having differently spaced teeth. A detent 21 is attached to bearing 4 and projects into an annular groove 22 to prevent movement of collar 18.

Provision is made for positioning the cutting blade 9 at different distances relative to the spindle 45, as for brake drums of different diameters and for brake drums which have their braking surfaces on the outer surface or the inner surface. Other cutting means than the blade 9 may be used, as an emery wheel.

A holding block 23 is rigid with the platform 1. This block 23 has angular grooves 24. A blade holder 25 is to be mounted in either one of the grooves 24 according to requirement. The holder 25 is cylindrical in form except the blade holding portion 26 is formed by cutting metal away to make approximately a semi-cylindrical portion 26. The blade holder 25 is held in the required position by a clamp 27 and bolt 28, nut 29 and washer 30. The clamp 27 may be turned 180 degrees if the blade holder 25 should have to be placed in the outermost angular groove 24 for adjusting the blade to the work. A brace 31 may be provided for the clamp 27.

Various changes in the sizes, proportions, construction, and arrangement of the several parts may be made without departing from our invention.

The block 23 is movable laterally on the platform 1 for positioning the blade 9. A bearing 32 is formed on the platform 1. A downward projection 33 is formed on the block 23 and provided with a threaded opening. A screw shaft 34 is journaled in the bearing 32 and a collar 35 prevents axial movement of the shaft 34. This shaft is operated through the projection 33 to move the block 23 to different positions.

A driving coupling 36 to be connected with some driving power is provided for engaging the portion 13 of shaft 7 for operating the machine. The portion 13 is square in cross-section so that the shaft 7 may be moved to different positions axially and still be driven.

On the completion of the stroke or travel of the work-carrying shaft, the portion 13 will be automatically disconnected from the driving means so that there will no damage to the machine. The end of the shaft member 7 has a cylindrical portion projecting beyond the square portion so that the shaft 7 will not be driven by the driving connection.

What we claim, is,—

1. A brake drum truing machine comprising a platform and bearing members formed on said platform, a work carrying shaft and a work adjusting shaft journaled in said bearing members, means for driving said work shaft, operative connections including a ratchet wheel rigid with said adjusting shaft and a spring dog on said work shaft whereby said work shaft drives said adjusting shaft intermittently, operative connections for said shaft whereby said adjusting shaft moves said work carrying shaft axially step by step after each revolution of said work shaft, a cutting blade, and means for holding the blade in position to operate on work carried by said work shaft.

2. A brake drum truing machine comprising a platform and bearing members carried by said platform, a work carrying shaft and a work adjusting shaft journaled in said bearings, operative connections whereby said work shaft drives said adjusting shaft intermittently, means for driving said work shaft, operative connections including threads on said adjusting shaft, a collar rigid with said work shaft, and a nut carried by said collar for engaging said threads whereby said adjusting shaft drives said work shaft axially after each revolution of the work shaft, a cutting blade, and means for holding said blade in position to operate on work carried by said work shaft.

3. A brake drum truing machine comprising a platform and bearing members carried by said platform, a work carrying shaft and a work adjusting shaft journaled in said bearing members, operative connections for said shafts whereby the work shaft drives the work adjusting shaft intermittently and the adjusting shaft moves the work shaft axially after each revolution of the work shaft, means for driving said work shaft, a cutting blade, and means for positioning said blade for operating on work carried by said work shaft including a bearing block, means for adjusting said block laterally, a chuck carrying said blade, means for holding said chuck at different positions on said block, and means for holding said blade at different angles on said chuck.

4. A brake drum truing machine comprising a platform and bearing members carried by said platform, a work carrying shaft and a work adjusting shaft journaled in said bearing members, operative connections whereby said work shaft drives said adjusting shaft intermittently and said adjusting shaft moves said work shaft axially for adjusting work in position to be operated upon, a cutting blade, and means for positioning said blade for operating on work carried by said work carrying shaft including a bearing block having angular grooves in the face thereof, a blade holder cylindrical in form to be mounted in one of said grooves and having a flat bearing face for receiving said blade, means for holding said blade at different angles on said bearing face, and means for clamping said blade holder in said groove.

5. A brake drum truing machine comprising a platform and bearing members formed on said platform, a work carrying shaft and a work adjusting shaft journaled in said bearing members, operative connections whereby said work shaft drives said adjusting shaft intermittently and said adjusting shaft moves said work shaft axially for adjusting work in position to be operated upon including threads on said adjusting shaft, a collar rigid with said work carrying shaft and a nut rigid with said collar and engaging said threads, a ratchet wheel rigid with said adjusting shaft, a collar loosely and non-rotatably mounted on said work carrying shaft, said work shaft being movable through said collar, means for preventing longitudinal movement of said collar on said shaft, a spring dog carried by said collar for actuating said ratchet wheel, and means for driving said work shaft.

In testimony whereof, we set our hands, this 15th day of November, 1929.

SAMUEL A. B. HAMILTON.
CHRISTIAN A. LAUSEN.